(12) United States Patent
Rotholtz

(10) Patent No.: US 8,055,639 B2
(45) Date of Patent: *Nov. 8, 2011

(54) SYSTEM AND METHOD FOR OFFERING COMPLEMENTARY PRODUCTS / SERVICES

(75) Inventor: Ben Aaron Rotholtz, Yarrow Point, WA (US)

(73) Assignee: RealNetworks, Inc., Seattle, WA (US)

( * ) Notice: Subject to any disclaimer, the term of this patent is extended or adjusted under 35 U.S.C. 154(b) by 1273 days.

This patent is subject to a terminal disclaimer.

(21) Appl. No.: 11/619,061

(22) Filed: Jan. 2, 2007

(65) Prior Publication Data

US 2008/0046332 A1   Feb. 21, 2008

Related U.S. Application Data

(63) Continuation-in-part of application No. 11/506,456, filed on Aug. 18, 2006, now Pat. No. 7,788,249.

(51) Int. Cl.
G06F 17/30 (2006.01)
(52) U.S. Cl. ......... 707/706; 707/713; 707/721; 707/728
(58) Field of Classification Search ........... 707/706–713
See application file for complete search history.

(56) References Cited

U.S. PATENT DOCUMENTS

| | | | | |
|---|---|---|---|---|
| 6,671,681 B1 * | 12/2003 | Emens et al. | ................. | 707/706 |
| 6,760,720 B1 * | 7/2004 | De Bellis | ...................... | 707/706 |
| 7,092,936 B1 * | 8/2006 | Alonso et al. | ................. | 707/737 |
| 7,461,051 B2 * | 12/2008 | Lavine | ................................ | 1/1 |
| 7,627,561 B2 * | 12/2009 | Pell et al. | ............................. | 1/1 |
| 7,953,740 B1 * | 5/2011 | Vadon et al. | .................. | 707/751 |
| 2002/0069194 A1 * | 6/2002 | Robbins | ........................... | 707/3 |
| 2003/0001880 A1 | 1/2003 | Holtz et al. | | |
| 2004/0111467 A1 | 6/2004 | Willis | | |
| 2004/0143569 A1 * | 7/2004 | Gross et al. | ....................... | 707/3 |
| 2004/0189707 A1 | 9/2004 | Moore et al. | | |
| 2004/0193580 A1 | 9/2004 | Martin et al. | | |
| 2004/0193600 A1 | 9/2004 | Kaasten et al. | | |
| 2005/0071255 A1 * | 3/2005 | Wang et al. | ..................... | 705/27 |
| 2005/0160107 A1 | 7/2005 | Liang | | |
| 2005/0278288 A1 * | 12/2005 | Plow et al. | ........................ | 707/1 |
| 2005/0278312 A1 * | 12/2005 | Plow et al. | ........................ | 707/3 |
| 2005/0278313 A1 * | 12/2005 | Plow et al. | ........................ | 707/3 |
| 2006/0020591 A1 | 1/2006 | Kommers et al. | | |
| 2006/0026147 A1 | 2/2006 | Cone et al. | | |
| 2006/0064411 A1 | 3/2006 | Gross et al. | | |
| 2006/0116994 A1 * | 6/2006 | Jonker et al. | ...................... | 707/3 |
| 2006/0136391 A1 | 6/2006 | Morris | | |
| 2006/0195443 A1 * | 8/2006 | Franklin et al. | ................... | 707/5 |

(Continued)

OTHER PUBLICATIONS

Notice of Allowance, U.S. Appl. No. 11/619,042, Rotholtz, Ben Aaron, filed Jan. 2, 2007.

(Continued)

*Primary Examiner* — Hanh Thai
(74) *Attorney, Agent, or Firm* — ÆON Law; Adam L. K. Philipp; Kyle H. Flindt

(57) ABSTRACT

A method, computer program product and computing device for offering complementary products/services includes generating a result set based, at least in part, upon one or more actions taken by a user while browsing a website. At least one item is selected from the result set. A complementary result set is generated that defines, at least in part, one or more products/services that complement the at least one item selected from the result set.

27 Claims, 14 Drawing Sheets

U.S. PATENT DOCUMENTS

| | | |
|---|---|---|
| 2006/0218111 A1* | 9/2006 | Cohen ............................ 706/45 |
| 2006/0224729 A1 | 10/2006 | Rowe et al. |
| 2006/0282408 A1* | 12/2006 | Wisely et al. ..................... 707/3 |
| 2007/0027902 A1 | 2/2007 | Ponte |
| 2007/0043730 A1* | 2/2007 | Wisely ........................... 707/10 |
| 2007/0207780 A1 | 9/2007 | McLean |
| 2007/0208746 A1 | 9/2007 | Koide et al. |
| 2007/0255754 A1 | 11/2007 | Gheel |
| 2008/0034374 A1 | 2/2008 | Davis |
| 2008/0059455 A1 | 3/2008 | Canoy et al. |
| 2008/0126305 A1* | 5/2008 | Sayeler et al. .................... 707/3 |

OTHER PUBLICATIONS

Notice of Allowance, U.S. Appl. No. 11/506,456, Rotholtz, Ben Aaron, filed Aug. 18, 2006.

* cited by examiner

SYSTEM AND METHOD FOR OFFERING COMPLEMENTARY PRODUCTS / SERVICES

RELATED APPLICATIONS

This application is a Continuation-in-Part of and claims the priority of the following application, which is herein incorporated by reference: U.S. Ser. No. 11/506,456, filed 18 Aug. 2006 now U.S. Pat. No. 7,788,249, and entitled SYSTEM AND METHOD FOR AUTOMATICALLY GENERATING A RESULT SET.

TECHNICAL FIELD

This disclosure relates to internet-based sales of products/services and, more particularly, to internet-based sales of complementary products/services.

BACKGROUND

When a user browses a website, the actions taken by the user may be indicative of the various likes and dislikes of the particular user. For example, if the browser of a website reviews material concerning a particular type of music, these actions may be indicative of the user being a fan of that type of music. Further, if the browser of a website reviews material concerning a particular political party, these actions may be indicative of the user being a member of/interested in that political party. Accordingly, by monitoring the actions taken by a browser of a website, the particular tastes of the user may be discernible.

Additionally, once the particular likes of the user are determined, the user may be interested in purchasing complementary products/services if the user were made aware of the availability of such complementary products/services.

SUMMARY OF DISCLOSURE

In a first implementation, a method of offering complementary products/services includes generating a result set based, at least in part, upon one or more actions taken by a user while browsing a website. At least one item is selected from the result set. A complementary result set is generated that defines, at least in part, one or more products/services that complement the at least one item selected from the result set.

One or more of the following features may be included. Generating a result set may include monitoring one or more actions taken by the user while browsing the website. One or more search terms may be assigned to each of the one or more actions taken by the user, thus defining one or more initial search terms. An initial query may be executed on a datastore based on at least a portion of the one or more initial search terms to generate the result set. The result set may be presented to the user of the website.

Generating a result set further may include filtering the result set in accordance with filtering criteria defined by the user. Filtering the result set may include supplementing the one or more initial search terms with one or more user-defined search terms. A filtering query based on at least a portion of the one or more user-defined search terms may be executed.

Generating a complementary result set may include assigning one or more complementary terms that define one or more products/services that complement the at least one item selected from the result set. A query may be executed on a datastore based on at least a portion of the at least one item selected from the result set and at least a portion of the one or more complementary terms to generate the complementary result set. The complementary result set may be presented to the user of the website.

Generating a complementary result set may include generating a query string based, at least in part, upon the one or more actions taken by a user while browsing a website. A query may be executed on a third party datastore based on the query string to generate the complementary result set. The complementary result set may be presented to the user of the website.

The sale of the one or more products/services that complement the at least one item selected from the result set may be facilitated. A fee may be charged for facilitating the sale of the one or more products/services that complement the at least one item selected from the result set. Facilitating the sale of the one or more products/services that complement the at least one item selected from the result set may include providing a link to an ecommerce website that offers for sale the one or more products/services that complement the at least one item selected from the result set.

The one or more products/services that complement the at least one item selected from the result set may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

In another implementation, a computer program product resides on a computer readable medium and has a plurality of instructions stored on it. When executed by a processor, the instructions cause the processor to generate a result set based, at least in part, upon one or more actions taken by a user while browsing a website. At least one item is selected from the result set. A complementary result set is generated that defines, at least in part, one or more products/services that complement the at least one item selected from the result set.

One or more of the following features may be included. Generating a result set may include monitoring one or more actions taken by the user while browsing the website. One or more search terms may be assigned to each of the one or more actions taken by the user, thus defining one or more initial search terms. An initial query may be executed on a datastore based on at least a portion of the one or more initial search terms to generate the result set. The result set may be presented to the user of the website.

Generating a result set further may include filtering the result set in accordance with filtering criteria defined by the user. Filtering the result set may include supplementing the one or more initial search terms with one or more user-defined search terms. A filtering query based on at least a portion of the one or more user-defined search terms may be executed.

Generating a complementary result set may include assigning one or more complementary terms that define one or more products/services that complement the at least one item selected from the result set. A query may be executed on a datastore based on at least a portion of the at least one item selected from the result set and at least a portion of the one or more complementary terms to generate the complementary result set. The complementary result set may be presented to the user of the website.

Generating a complementary result set may include generating a query string based, at least in part, upon the one or more actions taken by a user while browsing a website. A query may be executed on a third party datastore based on the query string to generate the complementary result set. The complementary result set may be presented to the user of the website.

The sale of the one or more products/services that complement the at least one item selected from the result set may be facilitated. A fee may be charged for facilitating the sale of the one or more products/services that complement the at least one item selected from the result set. Facilitating the sale of the one or more products/services that complement the at least one item selected from the result set may include providing a link to an ecommerce website that offers for sale the one or more products/services that complement the at least one item selected from the result set.

The one or more products/services that complement the at least one item selected from the result set may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

In another implementation, a computing device is configured to generate a result set based, at least in part, upon one or more actions taken by a user while browsing a website. At least one item is selected from the result set. A complementary result set is generated that defines, at least in part, one or more products/services that complement the at least one item selected from the result set.

One or more of the following features may be included. Generating a result set may include monitoring one or more actions taken by the user while browsing the website. One or more search terms may be assigned to each of the one or more actions taken by the user, thus defining one or more initial search terms. An initial query may be executed on a datastore based on at least a portion of the one or more initial search terms to generate the result set. The result set may be presented to the user of the website.

Generating a result set further may include filtering the result set in accordance with filtering criteria defined by the user. Filtering the result set may include supplementing the one or more initial search terms with one or more user-defined search terms. A filtering query based on at least a portion of the one or more user-defined search terms may be executed.

Generating a complementary result set may include assigning one or more complementary terms that define one or more products/services that complement the at least one item selected from the result set. A query may be executed on a datastore based on at least a portion of the at least one item selected from the result set and at least a portion of the one or more complementary terms to generate the complementary result set. The complementary result set may be presented to the user of the website.

Generating a complementary result set may include generating a query string based, at least in part, upon the one or more actions taken by a user while browsing a website. A query may be executed on a third party datastore based on the query string to generate the complementary result set. The complementary result set may be presented to the user of the website.

The sale of the one or more products/services that complement the at least one item selected from the result set may be facilitated. A fee may be charged for facilitating the sale of the one or more products/services that complement the at least one item selected from the result set. Facilitating the sale of the one or more products/services that complement the at least one item selected from the result set may include providing a link to an ecommerce website that offers for sale the one or more products/services that complement the at least one item selected from the result set.

The one or more products/services that complement the at least one item selected from the result set may be chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

The details of one or more implementations is set forth in the accompanying drawings and the description below. Other features and advantages will become apparent from the description, the drawings, and the claims.

DETAILED DESCRIPTION OF THE PREFERRED EMBODIMENTS

Figure 1:
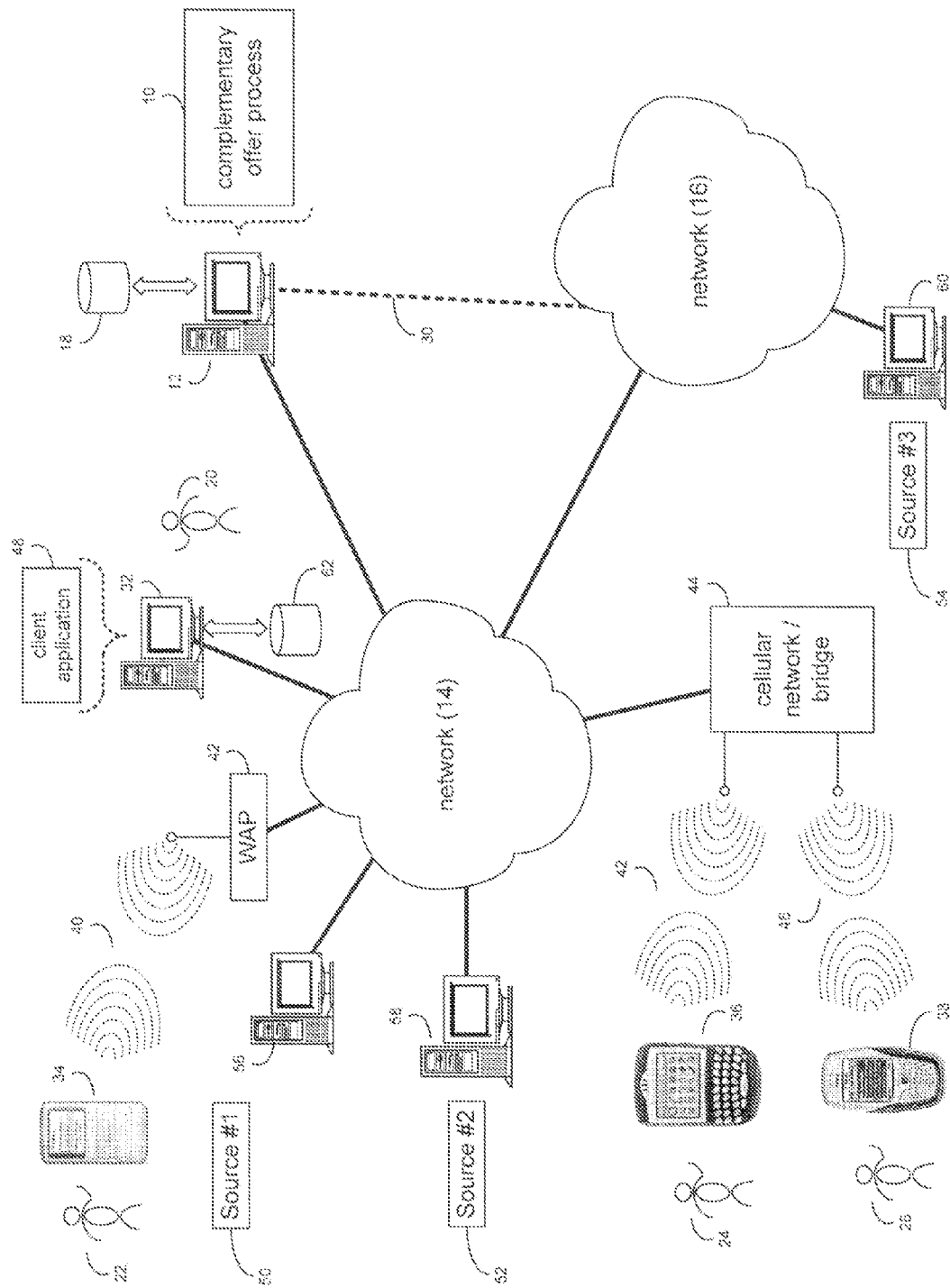
FIG. 1 is a diagrammatic view of a complementary offer process and a client application coupled to a distributed computing network.

System Overview:

Referring to FIG. 1, there is shown a complementary offer process 10 that may reside on and may be executed by data server 12. As will be discussed below in greater detail, complementary offer process 10 may monitor the actions taken by a user of a website and may automatically generate a result set based upon those monitored actions. Upon the user selecting at least one item from the result set, complementary offer process 10 may facilitate the sale of one or more products/services that complement the at least one item selected from the result set.

Examples of such products/services that complement the actions taken by the user may include, but are not limited to: concert tickets; clothing; memorabilia; compact discs; digital video discs; audio tapes; video tapes; books; magazines, photographs; autographs; posters; airline tickets; train tickets; ground transportation; consumer products; consumer services; business products; and business services. Examples of data server 12 may include, but are not limited to, a personal computer, a mini computer, or mainframe computer, for example.

Complementary offer process 10 may be a server application that resides on and is executed by data server 12, which may be connected to network 14 (e.g., the Internet). Data server 12 may be a web server (or series of servers) running a network operating system, examples of which may include but are not limited to: Microsoft Windows 2003 Server™; Novell Netware™; or Redhat Linux™, for example.

Data server 12 may also execute a web server application, examples of which may include but are not limited to: Microsoft IIS™, Novell Webserver™, or Apache Webserver™, that allows for HTTP (i.e., HyperText Transfer Protocol) access to data server 12 via network 14. Network 14 may be connected to one or more secondary networks (e.g., network 16), examples of which may include but are not limited to: a local area network; a wide area network; or an intranet, for example.

The instruction sets and subroutines of complementary offer process 10, which may be stored on a storage device 18 coupled to data server 12, may be executed by one or more processors (not shown) and one or more memory architectures (not shown) incorporated into data server 12. Storage device 18 may include but is not limited to: a hard disk drive; a tape drive; an optical drive; a RAID array; a random access memory (RAM); or a read-only memory (ROM).

Users 20, 22, 24, 26 may access complementary offer process 10 directly through network 14 or through secondary network 16. Further, data server 12 (i.e., the computer that executes complementary offer process 10) may be connected to network 14 through secondary network 16, as illustrated with phantom link line 30.

Users 20, 22, 24, 26 may access complementary offer process 10 through various client devices, examples of which may include but are not limited to client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), for example.

The various client devices may be directly or indirectly coupled to network 14 (or network 16). For example, client computer 32 is shown directly coupled to network 14 via a hardwired network connection. Further, personal media device 34 is shown wirelessly coupled to network 14 via wireless communication channel 40 established between personal media device 34 and wireless access point (i.e., WAP) 42, which is shown directly coupled to network 14. WAP 42 may be, for example, an IEEE 802.11a, 802.11b, 802.11g, Wi-Fi, and/or Bluetooth device that is capable of establishing wireless communication channel 40 between personal media device 34 and WAP 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Personal digital assistant 36 is shown wirelessly coupled to network 14 via wireless communication channel 42 established between personal digital assistant 36 and cellular network/bridge 44, which is shown directly coupled to network 14. Further, cellular telephone 38 is shown wirelessly coupled to network 14 via wireless communication channel 46 established between cellular telephone 38 and cellular network/bridge 44.

Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute a client application (e.g., client application 48) that interfaces with complementary offer process 10 and facilitates the bidirectional transfer of digital content between data sources (e.g., sources 50, 52, 54) and users (e.g., users 20, 22, 24, 26). Examples of data sources 50, 52, 54 include websites that are hosted by e.g., web servers 56, 58, 60, respectively.

Client application 48 may be a web browser (e.g., Microsoft Internet Explorer™ and Netscape Navigator™, for example), a stand alone application, or an applet running within another program (e.g., Microsoft Internet Explorer™ and Netscape Navigator™, for example). Client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), and a portable gaming device (e.g., a Sony Playstation™ Portable, not shown), may each execute an operating system, examples of which may include but are not limited to Microsoft Windows™, Microsoft Windows CE™, Redhat Linux™, or a custom operating system.

The instruction sets and subroutines of client application 48, which may be stored on a storage device (e.g., storage device 62) coupled to e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™ Portable, not shown), are executed by one or more processors (not shown) and one or more memory architectures (not shown) incorporated into e.g., client computer 32, personal media device 34, personal digital assistant 36, cellular telephone 38, a laptop computer (not shown), a notebook computer (not shown), a pager (not shown), a television (not shown), a cable box (not shown), a gaming device (e.g., a Microsoft Xbox™, not shown), or a portable gaming device (e.g., a Sony Playstation™ Portable, not shown). Storage device 62 may include but is not limited to a hard disk drive, a tape drive, an optical drive, a RAID array, a random access memory (RAM), or a read-only memory (ROM).

Using client application 48, users 20, 22, 24, 26 may visit one or more websites (e.g., 50, 52, 54) and perform various actions on the website(s). Examples of the various types of websites may include, but are not limited to: news websites (e.g., www.cnn.com, www.foxnews.com); weblog websites (e.g., www.blogspot.com, www.xanga.com); auction websites (e.g., www.ebay.com, www.bidz.com); dating/matchmaking websites (www.eharmony.com, www.match.com); special interest websites (e.g., www.ichef.com, www.imdb.com); search engine/internet portal websites (e.g., www.google.com, www.yahoo.com); ecommerce websites (e.g., www.amazon.com, www.overstock.com); and social networking websites (www.myspace.com, www.classmates.com, www.reunion.com, www.friendster.com).

Examples of the types of actions taken by a user may include, but are not limited to: rendering a media file; uploading a data file; downloading a data file; posting an article; reviewing an article; posting a message; reviewing a message; executing a query; purchasing a product; offering a product for sale; purchasing a service; and offering a service for sale.

Figure 2:
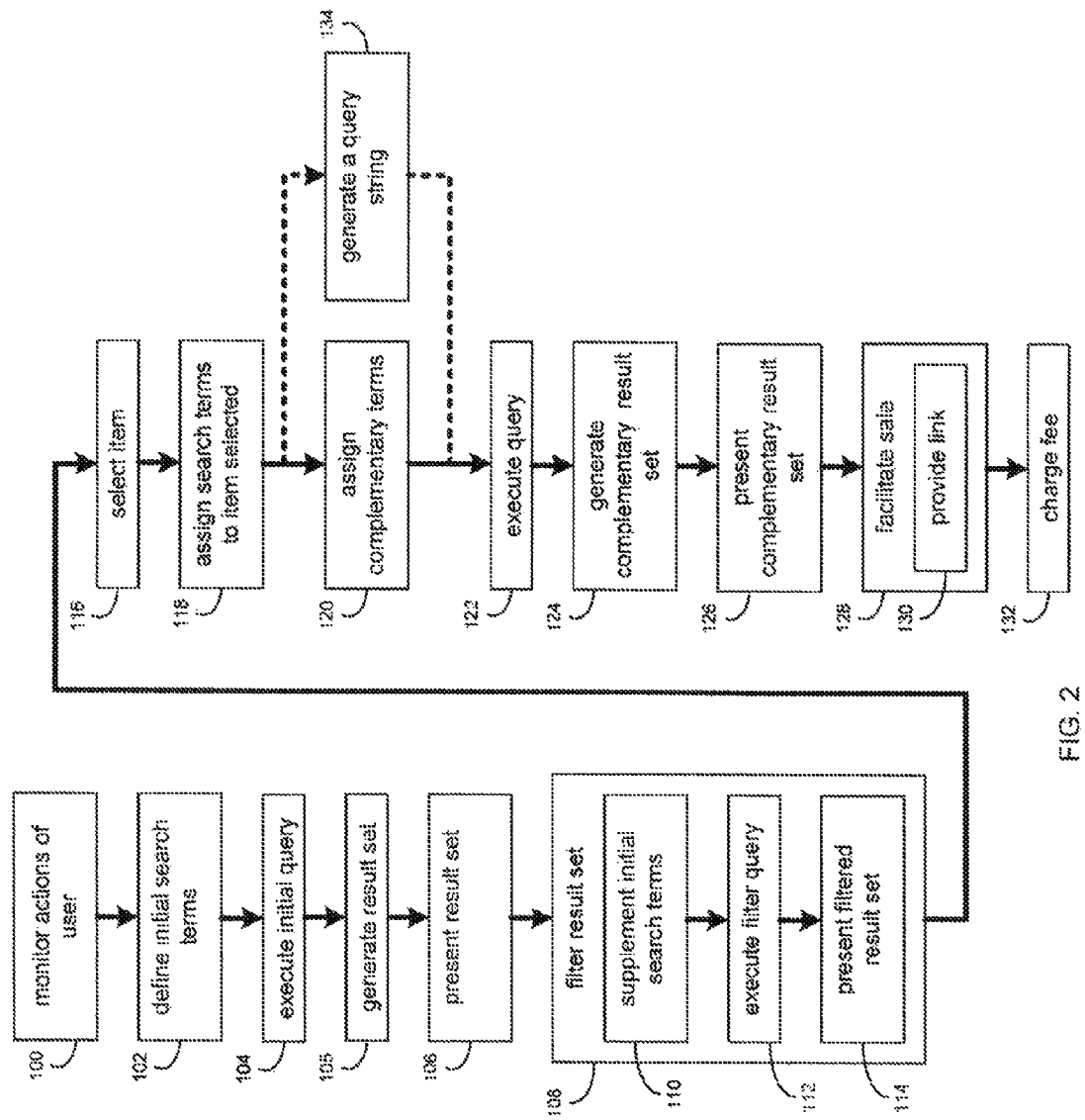
FIG. 2 is a flowchart of a process executed by the complementary offer process and/or the client application of FIG. 1.
Figure 3:
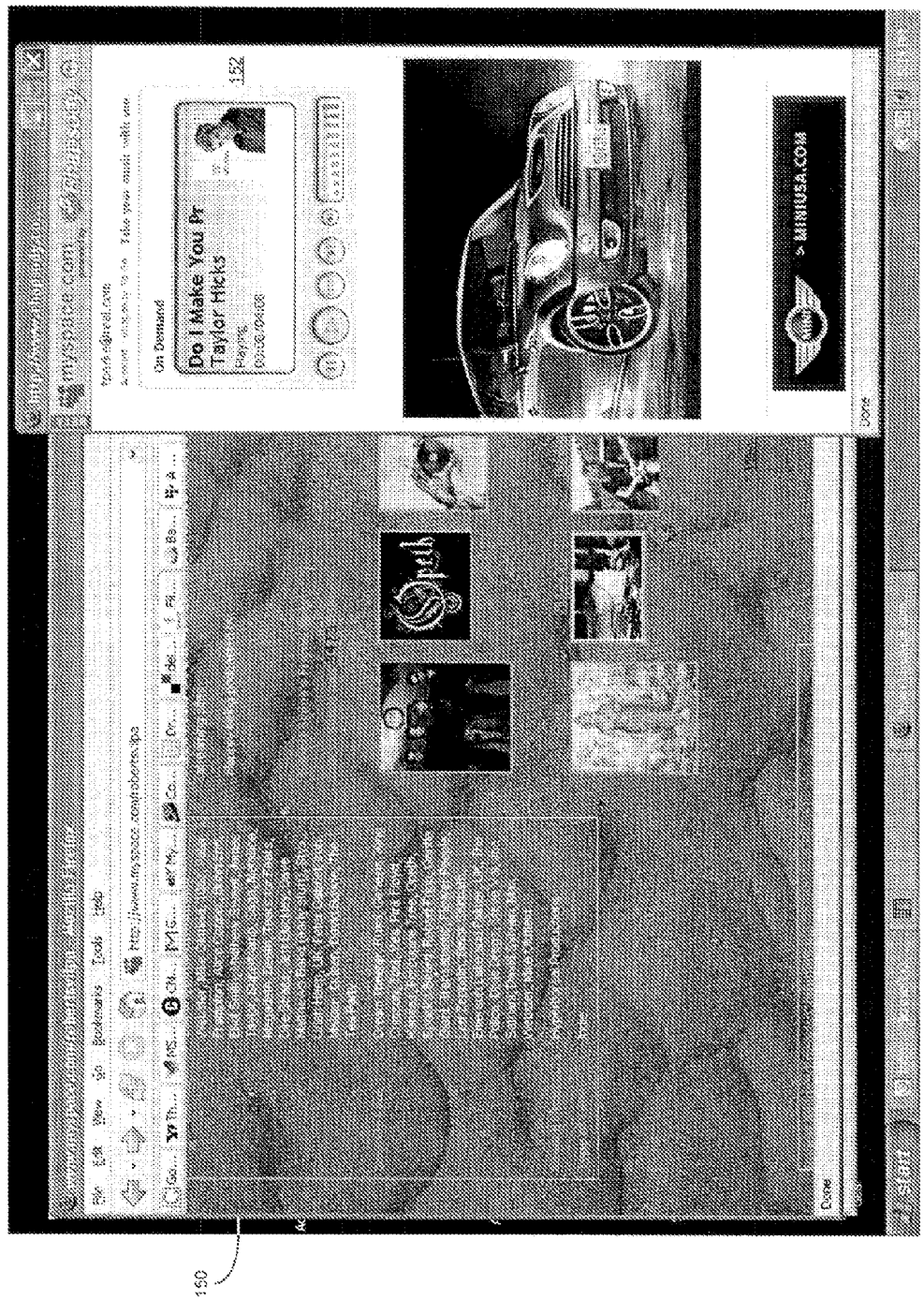
FIG. 3 is a diagrammatic view of a screen rendered by the complementary offer process and/or client application of FIG. 1.

The Complementary Offer Process:

Referring also to FIG. 2, when a user (e.g., user 20) browses a website, complementary offer process 10 may monitor 100 one or more actions taken by the user. For example and referring also to FIG. 3, assume that user 20 uses client application 48 to visit a social networking website (e.g., www.myspace.com). Client application 48 may render a webpage 150 that is presented to user 20.

While browsing e.g., the social networking website, user 20 may take one or more actions that (as discussed above) may be monitored 100 by complementary offer process 10. For example, user 20 may launch an application (e.g., Rhapsody™ by RealNetworks, Inc. and Windows MediaPlayer™ by The Microsoft Corporation) 152 that e.g., renders media files. For example, application 152 may render audio files, thus allowing user 20 to e.g., listen to music while browsing the website. Additionally/alternatively, application 152 may render video files, thus allowing user 20 to e.g., watch video clips while browsing the website.

Application 152 may be a stand alone application (e.g., Rhapsody™ by RealNetworks, Inc. and Windows MediaPlayer™ by The Microsoft Corporation), or an applet running within another program (e.g., client application 48, for example).

While application 152 is shown to be a media rendering application (e.g., Rhapsody™ by RealNetworks, Inc.), this is for illustrative purposes only and other types of applications are considered to be within the scope of this disclosure. For example, application 152 may be a searching application/applet that allows user 20 to search the content of the website that the user is browsing. For example, if the website is an auction/ecommerce website, application 152 may be a searching application that allows user 20 to search for various products available within the auction/ecommerce website.

Monitoring 100 the actions taken by the user may include, but is not limited to: monitoring the music listened to by user 20 while browsing the website; monitoring the videos watched by user 20 while browsing the website; monitoring the search strings/queries entered by user 20 while browsing the website; monitoring the articles reviewed by user 20 while browsing the website; monitoring the articles posted by user 20 while browsing the website; monitoring the files uploaded by user 20 to the website; monitoring the files downloaded by user 20 from the website; monitoring email/messages received by the user while browsing the website; monitoring email/messages posted by user 20 to the website; monitoring the products researched by user 20 while browsing the website; monitoring the products purchased by user 20 while browsing the website; monitoring the services researched by user 20 while browsing the website; and monitoring the services purchased by user 20 while browsing the website.

Continuing with the above-stated example, once user 20 accesses e.g., the social networking website and launches application 152 to e.g., listen to music, complementary offer process 10 may e.g., monitor 100 the music selected and rendered by the user. Complementary offer process 10 may assign 102 one or more search terms to each of the actions taken by user 20, thus defining one or more initial search terms. The manner in which complementary offer process 100 assigns 102 search terms to the actions taken by user 20 may vary depending on the type of action taken by the user. For example, if the action taken by the user is the rendering of a media file, the search terms assigned 102 to that action may be extracted from and/or based upon the metadata associated with the media file. For example, if user 20 (through application 152) renders a media file for the track "Do I Make You Proud" by Artist "Taylor Hicks", complementary offer process 10 may assign 102 one or more of the terms "Do", "I", "Make", "You", "Proud", "Taylor", "Hicks" to the action (i.e., the rendering of the track "Do I Make You Proud" by Artist "Taylor Hicks") taken by user 20, thus defining one or more initial search terms.

Complementary offer process 10 may execute 104 an initial query on a datastore based on at least a portion of the initial search terms to generate a result set. Examples of the datastore searched may include a database (not shown) servable by e.g., data server 12 and stored on storage device 18. Additionally/alternatively, the datastore may include a system memory (not shown) accessible by data server 12.

Continuing with the above-stated example, after execution 104 of the initial query and generation 105 of the result set, complementary offer process 10 may present 106 the result set to the user (e.g., user 20) of the website. The content/type of the result set may very depending on the type of website being visited and the actions taken by user 20. For example, if the website is a social networking website, the result set generated 105 by complementary offer process 10 may include a plurality of users who are members of the social community website and fans of the type of music that the user is listening to. If the website is an auction/ecommerce website, the result set generated 105 by complementary offer process 10 may include a plurality of objects offered for bid/for sale on the website that are related to objects being researched/purchased by user 20. Alternatively, if the user is listening to music while browsing the auction/ecommerce website, the result set generated 105 by complementary offer process 10 may include objects offered for bid/for sale on the website that are related to the artist being listened to by user 20 or the type of music that the artist plays. If the user is reading an article on a news website, the result set generated 105 by complementary offer process 10 may include a plurality of news articles related to (e.g., same author, same topic, same subject) the article being reviewed by user 20. If the user is listening to music while browsing the news website, the result set generated 105 by complementary offer process 10 may include news articles related to the artist being listened to by user 20 or the type of music that the artist plays.

Figure 4:
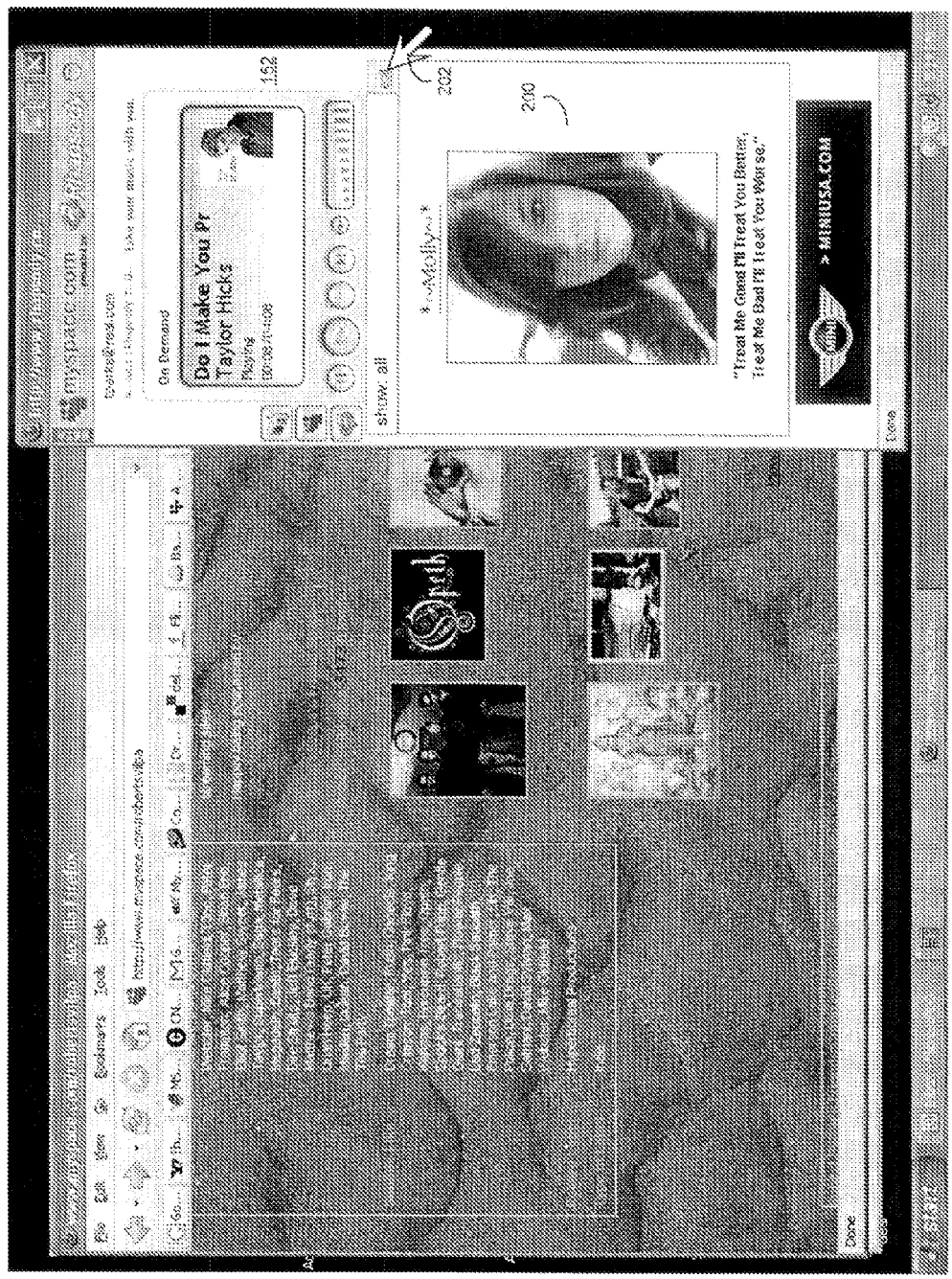
FIG. 4 is a diagrammatic view of a screen rendered by the complementary offer process and/or client application of FIG. 1.

Referring also to FIG. 4 and continuing with the above-stated example in which user 20 is listening (using application 152) to the track "Do I Make You Proud" by Artist "Taylor Hicks" while browsing a social networking website, the result set 200 may be generated 105 by complementary offer process 10 and presented 106 to user 20. In this particular example, result set 200 is shown to include a member of the social networking website named "Molly". However and for this example, as the social networking website may have millions of members, it is possible for result set 200 to be overly large and (essentially) unmanageable. Accordingly, complementary offer process 10 may allow user 20 to filter 108 result set 200 in accordance with filtering criteria defined by user 20. For example, user 20 may e.g., select the "edit" tag using screen pointer 202 (controllable by a pointing device, such as a mouse (not shown)) to enter a query focus screen.

Figure 5:
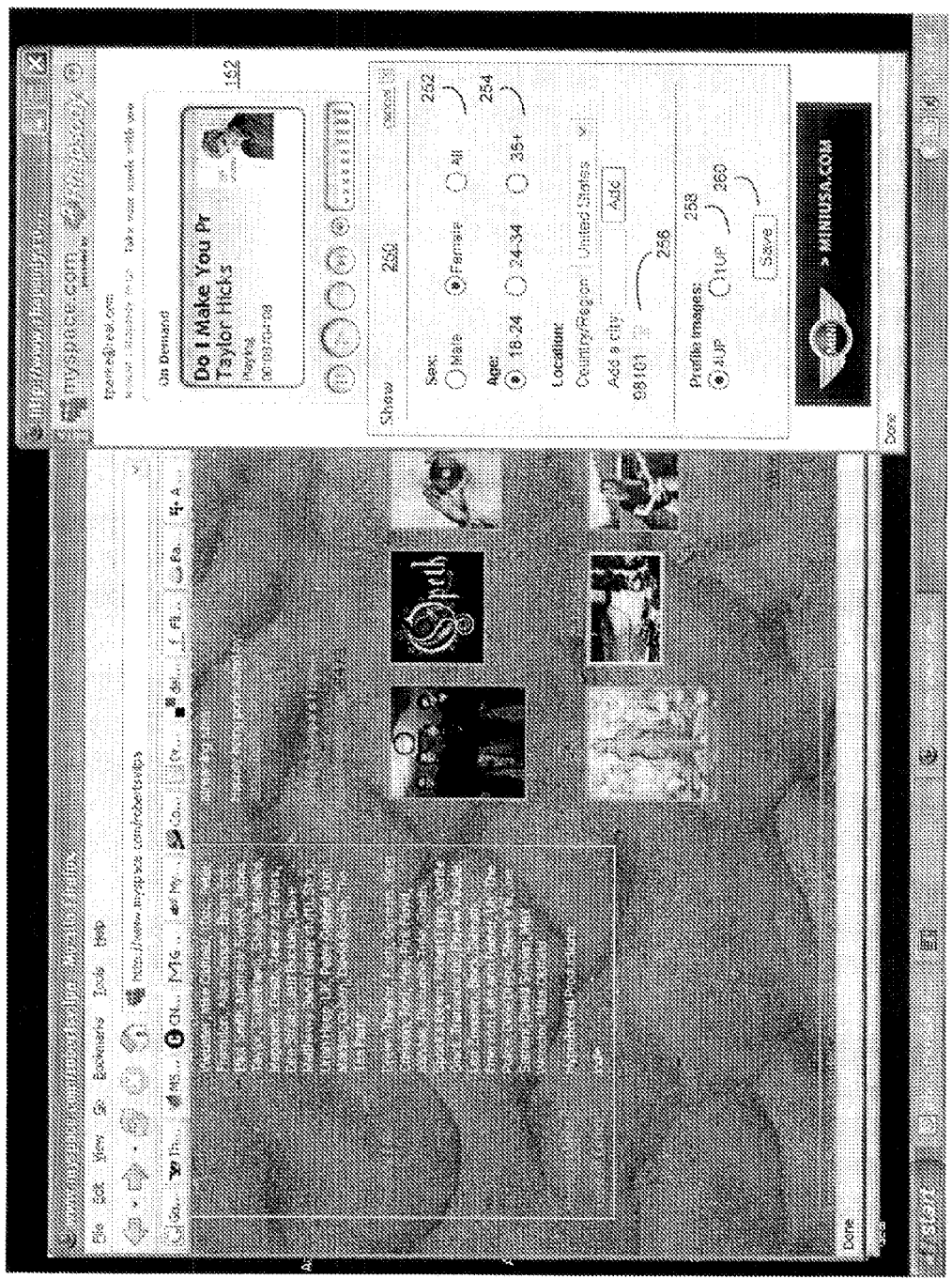
FIG. 5 is a diagrammatic view of a screen rendered by the complementary offer process and/or client application of FIG. 1.

Referring also to FIG. 5, through query focus screen 250, complementary offer process 10 may allow the user to supplement 110 the initial search terms (e.g., "Taylor" and "Hicks") with one or more user-defined search terms, examples of which may include (but are not limited to) the gender 252 of the members included within the result set, the age group 254 of the members included within the result set, the location 256 of the members included within the result set, and the grouping 258 of the members included within the result set. Once the user has supplemented 110 the initial search terms (e.g., "Taylor", "Hicks") with the user-defined search terms (e.g., "female", "18-24", "98101" and "4UP"), user 20 may save the "revised" search terms by e.g., selecting the "save" button 260 using e.g., screen pointer 202. Once saved, complementary offer process 10 may execute 112 a filtering query based on at least a portion of the user-defined search terms to generate a filtered result set. For example, automated search process may execute a filtering query based on "Taylor", "Hicks", "female", "18-24", "98101" and "4U").

Figure 6:
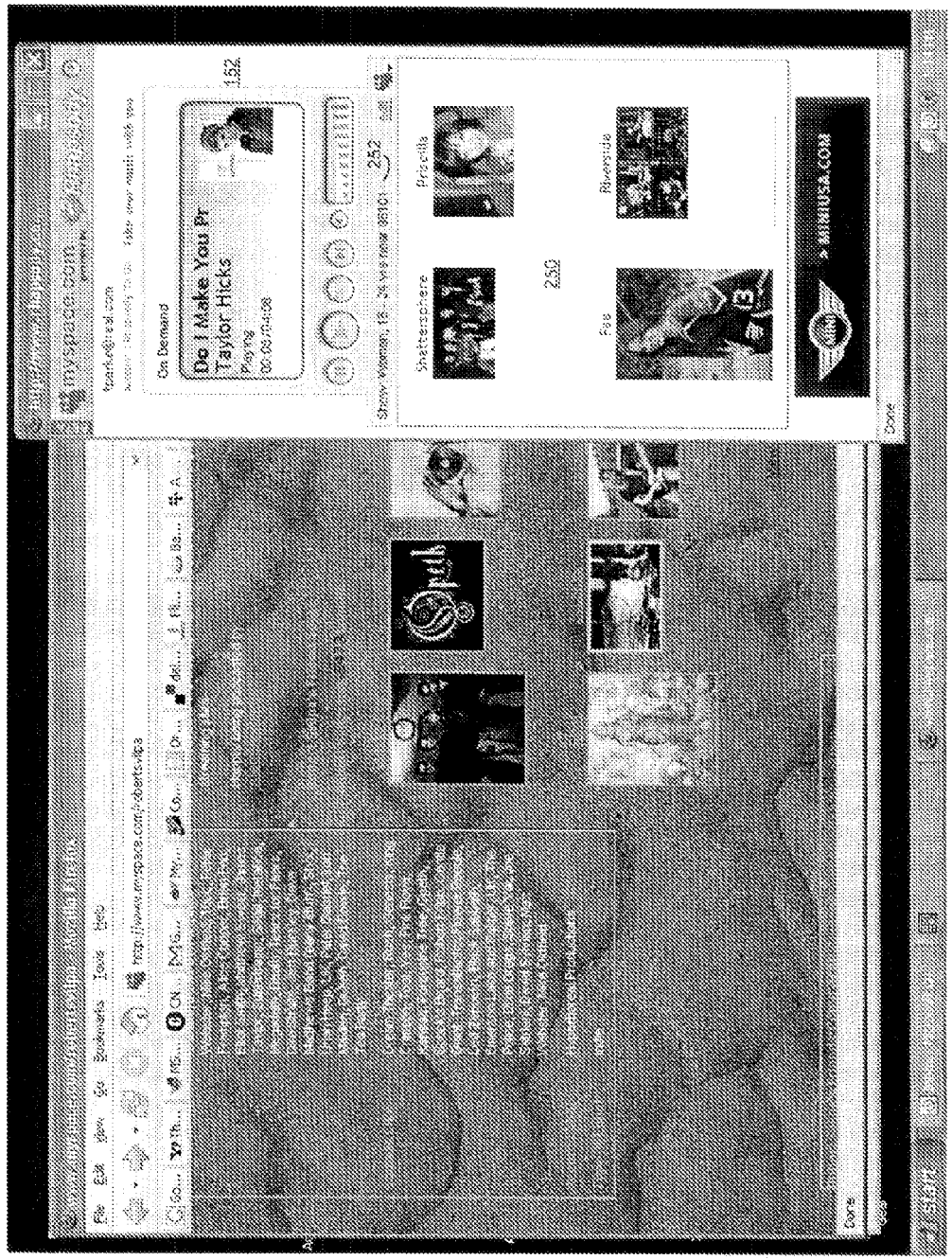
FIG. 6 is a diagrammatic view of a screen rendered by the complementary offer process and/or client application of FIG. 1.

Referring also to FIG. 6, complementary offer process 10 may present 114 filtered result set 250 to user 20. A filtering criteria indicator 252 may be rendered by complementary offer process 10 and may define the manner in which the initial result set was filtered. In this particular example, filtering criteria indicator 252 is defined as "Women, 18-24 yrs near 98101". While result set 200 was shown to include only one member per results set "page", as user 20 selected "4UP" (i.e., four members per page"), filtered result set 250 is shown to include four members per "page".

Figure 7:
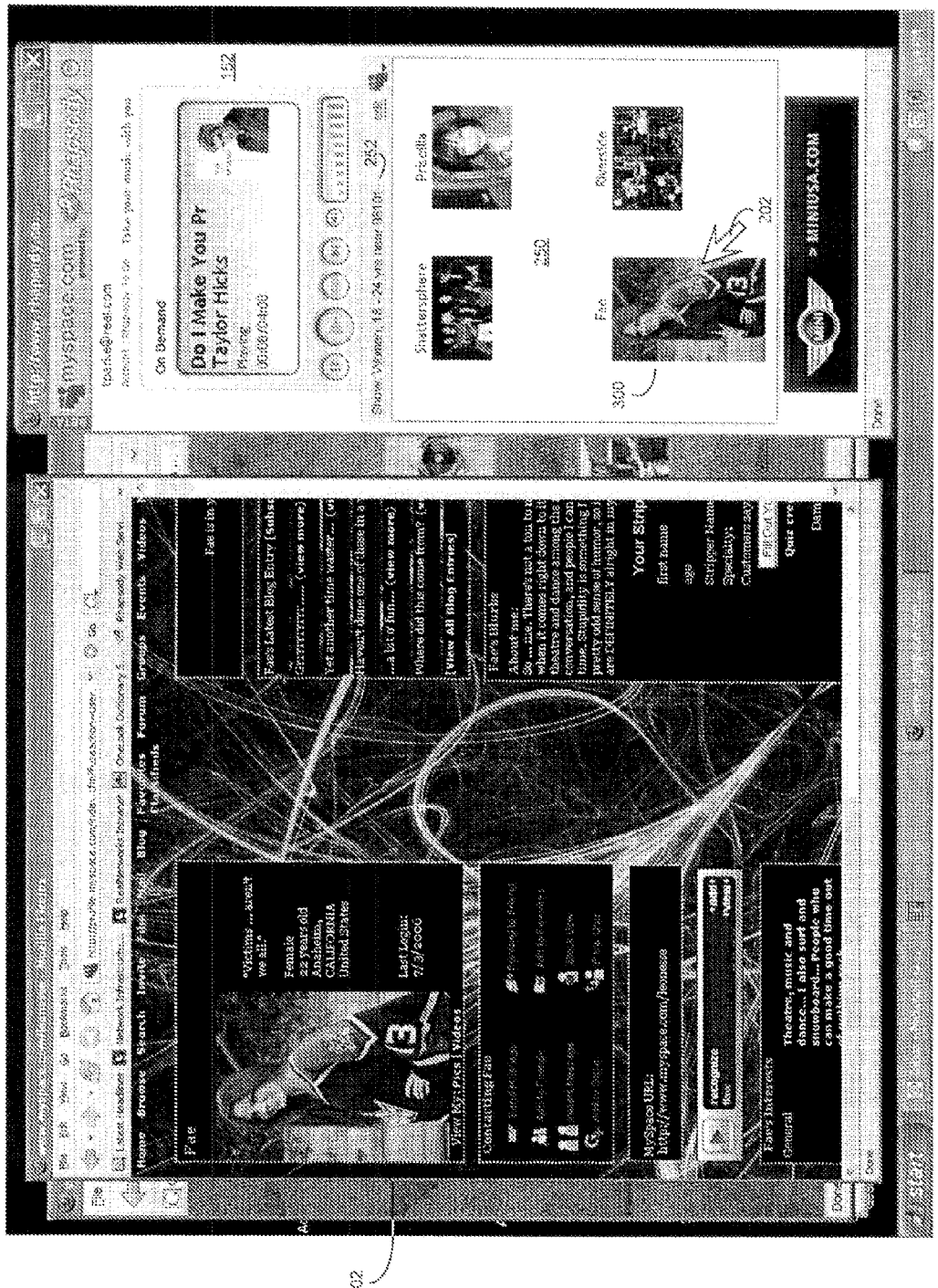
FIG. 7 is a diagrammatic view of a screen rendered by the complementary offer process and/or client application of FIG. 1.

Referring also to FIG. 7, if user 20 is interested in learning additional information concerning one or more items included in filtered result set 250 (e.g., member "Fae" 300), user 20 may select 116 "Fae" (using screen pointer 202) to retrieve a profile 302 of member "Fae" 300.

Complementary offer process 10 may assign 118 one or more search terms to the item selected by the user. For example, as "Fae" lives in Anaheim, Calif. and is a "Taylor Hicks" fan, the search terms "Anaheim", "CA", "Taylor", and "Hicks" may be assigned to "Fae" 300. Further, complementary offer process 10 may assign 120 one or more complementary terms that define one or more products/services that complement the item (e.g., "Fae" 300) selected by the user (e.g., User 20) from e.g., filtered result set 250.

The manner in which complementary offer process 100 assigns 120 the complementary terms may vary depending on the type of action taken by the user (which resulted in the generation of result sets 200, 250). Continuing with the above-stated example, as user 20 (through application 152) is rendering a media file for the track "Do I Make You Proud" by Artist "Taylor Hicks", user 20 may be interested in "Taylor Hicks" related products/services, especially being that "Fae" 300 is also a "Taylor Hicks" fan.

Examples of such "Taylor Hicks" related products/services may include, but are not limited to, concerts tickets, albums, compact discs, digital video discs, posters, clothing, memorabilia, and consumer goods, for example. Therefore, complementary offer process 10 may assign 120 complementary terms "tickets", "compact discs", "clothing", "memorabilia", "tour", and "official webpage".

Figure 8:
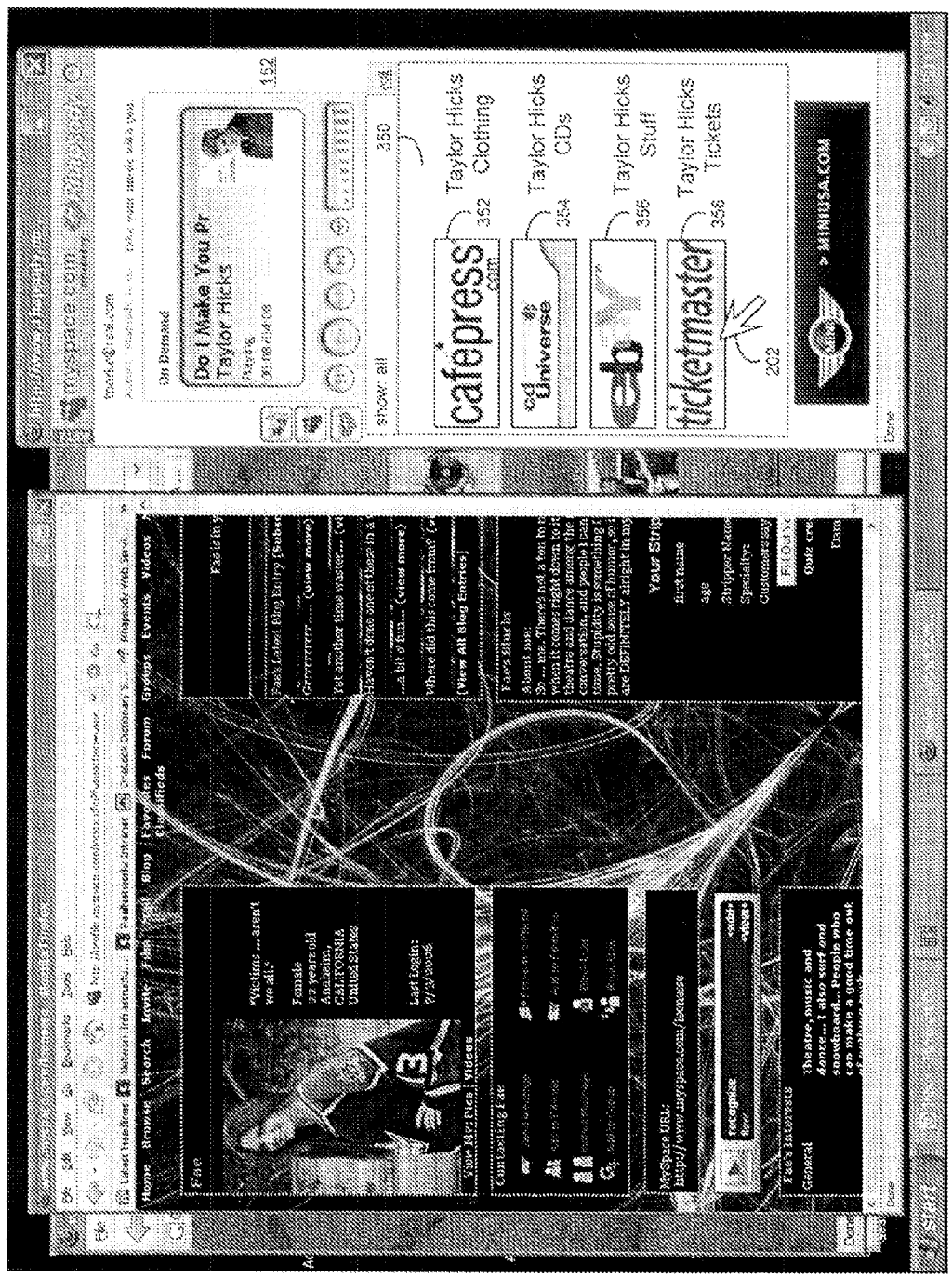
FIG. 8 is a diagrammatic view of a screen rendered by the complementary offer process and/or client application of FIG. 1.

Referring also to FIG. 8, complementary offer process 10 may execute 122 a query on a datastore based upon at least a portion of the at least one item (e.g., "Fae" 300) selected from result set (e.g., filtered result set 250) and at least a portion of the one or more complementary terms to generate complementary result set 350.

Continuing with the above-stated example, complementary offer process 10 may execute 122 a query based on the terms "Anaheim", "CA", "Taylor", and "Hicks", (i.e., the search terms assigned to "Fae" 300) and "tickets", "compact discs", "memorabilia", and "clothing" (chosen from the complementary terms).

Continuing with the above-stated example, after execution 122 of the query and generation 124 of the complementary result set, complementary offer process 10 may present 126 the complementary result set to the user (e.g., user 20) of the website. The content/type of the complementary result set may very depending on complementary search terms assigned 104 by complementary offer process. As the complementary terms assigned 120 include "tickets", "compact discs", "memorabilia" and "clothing", the complementary result set may include links that facilitate 128 the sale of Taylor Hicks related "tickets", "compact discs", "memorabilia" and "clothing".

Continuing with the above-stated example in which user 20 is listening (using application 152) to the track "Do I Make You Proud" by Artist "Taylor Hicks" while browsing a social networking website and selects 116 "Fae" 300 from filtered result set 250, complementary result set 350 may be generated 124 by complementary offer process 10 and presented 126 to user 20. In this particular example, result set 350 is shown to include a plurality of icons 352, 354, 356, 358 that provide 130 links to various ecommerce websites. For example, icon 352 may provide 130 a link to www.cafepress.com (i.e., a merchandise ecommerce website); icon 354 may provide 130 a link to www.cduniverse.com (i.e., a compact disc ecommerce website), icon 356 may provide 130 a link to www.ebay.com (i.e., a auction ecommerce website), and icon 358 may provide 130 a link to www.ticketmaster.com (i.e., a ticket ecommerce website); each of which may be selectable via screen pointer 202 (which may be controllable via a mouse/pointing device, not shown).

Figure 9:
FIG. 9 is a diagrammatic view of a screen rendered by the complementary offer process and/or client application of FIG. 1.

Referring also to FIG. 9 and continuing with the above-stated example, assume that user 20 wishes to take "Fae" 300 to an upcoming Taylor Hicks concert in Los Angeles, Calif. (which is about 26 miles from Fae's hometown of Anaheim, Calif.). User 20 may select (with screen pointer 202) icon 358, which provides 130 a link to a ticket ecommerce website (e.g., www.ticketmaster.com) 400, which may be rendered by complementary offer process 10 and may be navigable via screen pointer 202. In this particular example, the link provided 130 is:

http://www.ticketmaster.com/event/
09003D2FE66695E9?artistid=726127&majorcatid=
10001&minorcatid=3&tm_link=tm_home_f3

Figure 10:
FIG. 10 is a diagrammatic view of a screen rendered by the complementary offer process and/or client application of FIG. 1.
Figure 11:
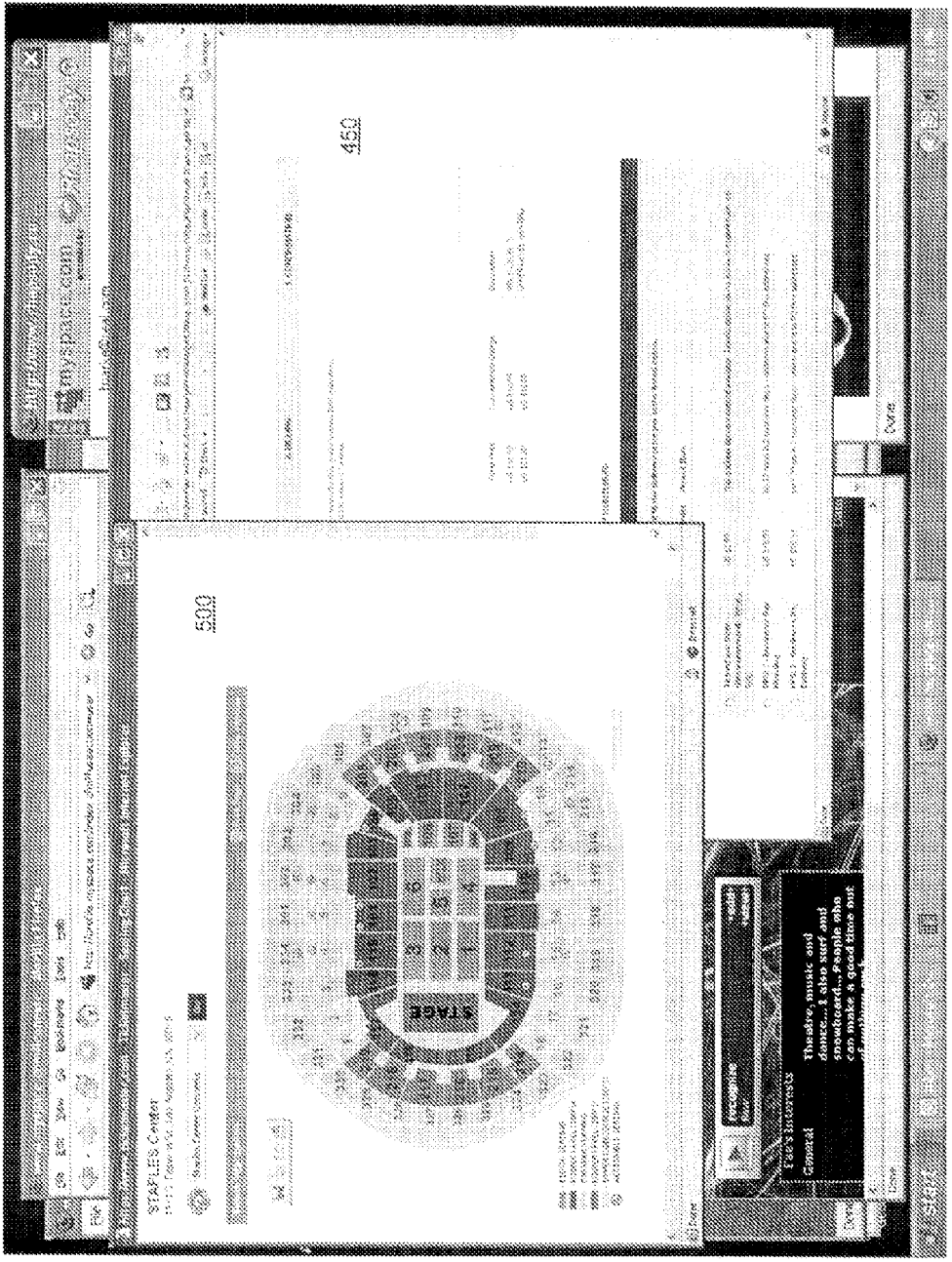
FIG. 11 is a diagrammatic view of a screen rendered by the complementary offer process and/or client application of FIG. 1.

In this particular example, user 20 may select the desired quantity and type of seats (via dropdown menus 402) and then select the "Look For Tickets" button 404 (using e.g., screen pointer 202). Referring also to FIG. 10, once e.g., button 404 is selected by user 20, complementary offer process 10 may render ticket purchase webpage 450 that allows user 20 to purchase Taylor Hicks tickets. User 20 may select (via screen pointer 202) seating chart link 452, which may result in the rendering of a seating chart 500 (FIG. 11) for the appropriate venue (e.g., The Staples Center).

Assuming that user 20 completes the sale of the tickets, complementary offer process 10 may charge 132 a referral fee to the appropriate merchant. For example, assume that user 20 purchases a pair of Taylor Hicks tickets having a face value of $51.50 each, complementary offer process 10 may charge 132 the merchant (e.g., Ticket Master) a 1.00% referral fee (i.e., $1.03) for facilitating 110 the sale of the tickets.

When providing 130 the link to the ticket ecommerce website, a referring party identifier may be embedded within the link to allow for accurate charging 132 of referral fees. For example, the link provide may be as follows:

http://www.ticketmaster.com/event/09003D2FE66695E9?artistid=726127&majorcatid=10001&minorcatid=3&tm_link=tm_home_f3&referrer=9160307

In the above-listed link, the referrer=9160307 portion of the link may identify the referring party (e.g., RealNetworks, Inc) and enable payment of the referral fee from the merchant (e.g., Ticket Master) to the referring party (e.g., RealNetworks, Inc.).

Figure 12:
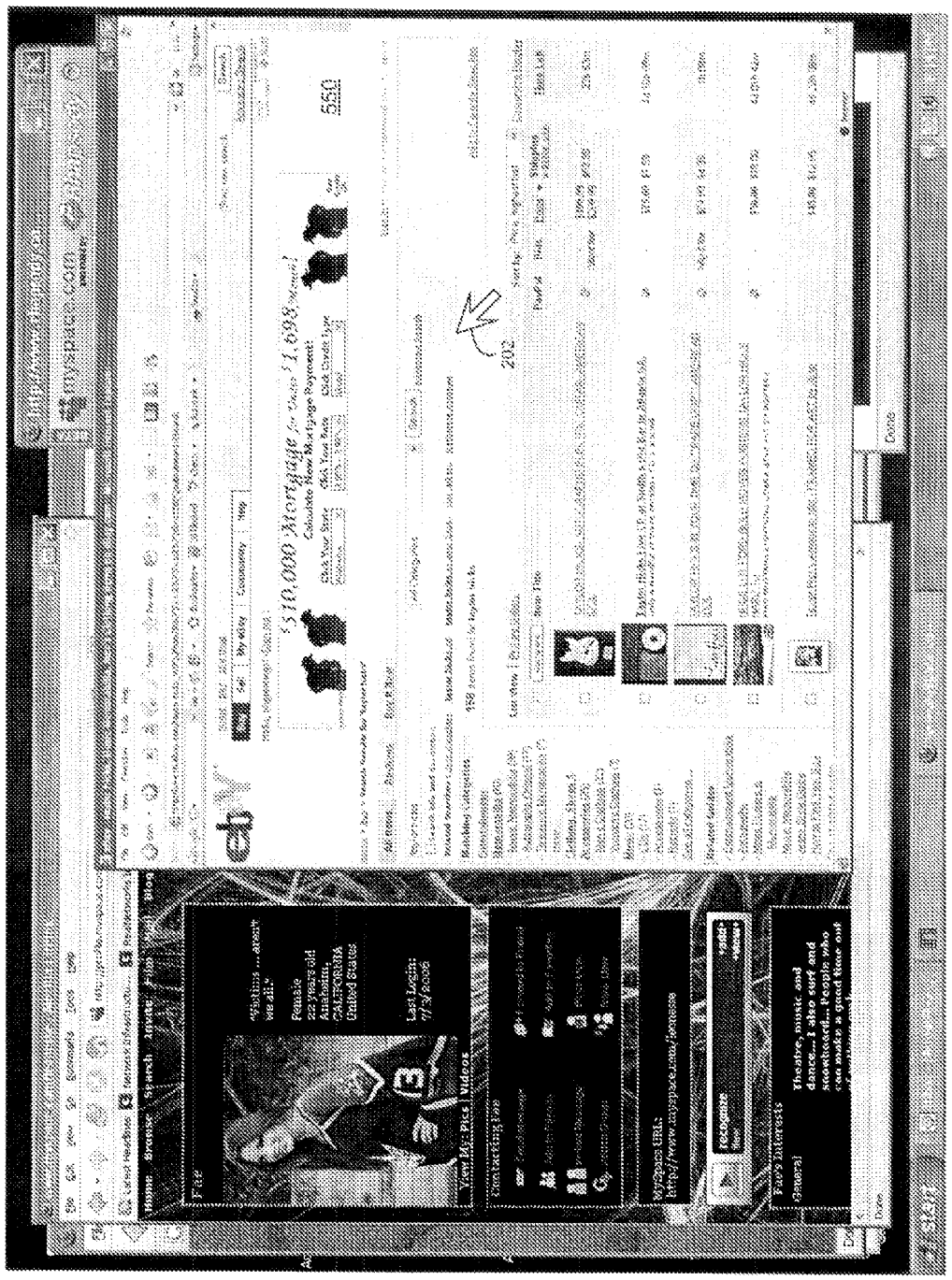
FIG. 12 is a diagrammatic view of a screen rendered by the complementary offer process and/or client application of FIG. 1.

Continuing with the above-stated example, assume that user 20 wishes to buy some Taylor Hick memorabilia for him and Fae in preparation of the upcoming concert. User 20 may select (with screen pointer 202) icon 356, which provides 130 a link to an auction ecommerce website (e.g., www.ebay.com) 550 (FIG. 12), which may be rendered by complementary offer process 10 and may be navigable via screen pointer 202. In this particular example, the link provided 130 is:

http://search.ebay.com/taylor-hicks_W0QQfromZR8QQfsooZ2QQfsopZ3QQsbrsrtZdQQsubmitsearch ZSearch When providing 130 the link to the auction ecommerce website, a referring party identifier may be embedded within the link to allow for accurate charging 132 of referral fees. For example, the link provide may be as follows:

http://search.ebay.com/taylor-hicks_W0QQfromZR8QQfsooZ2QQfsopZ3QQsbrsrtZdQQsubmitsearch ZSearch&referrer=9160307

In the above-listed link, the referrer=9160307 portion of the link may identify the referring party (e.g., RealNetworks, Inc) and enable payment of the referral fee from the merchant (e.g., EBay) to the referring party (e.g., RealNetworks, Inc.).

Figure 13:
FIG. 13 is a diagrammatic view of a screen rendered by the complementary offer process and/or client application of FIG. 1.

Continuing with the above-stated example, further assume that user 20 wishes to buy some Taylor Hick compact discs so that he and Fae can listen to them on the way to the concert. User 20 may select (with screen pointer 202) icon 354, which provides 130 a link to a compact disc ecommerce website (e.g., www.cduniverse.com) 600 (FIG. 13), which may be rendered by complementary offer process 10 and may be navigable via screen pointer 202. In this particular example, this link provided 130 is:

http://www.cduniverse.com/search/xx/music/artist/Hicks,+Taylor/a/Taylor+Hicks.htm When providing 130 the link to the compact disc ecommerce website, a referring party identifier may be embedded within the link to allow for accurate charging 132 of referral fees. For example, the link provide may be as follows:

http://www.cduniverse.com/search/xx/music/artist/Hicks,+Taylor/a/Taylor+Hicks.htm&referrer=9160307

In the above-listed link, the referrer=9160307 portion of the link may identify the referring party (e.g., RealNetworks, Inc) and enable payment of the referral fee from the merchant (e.g., CD Universe) to the referring party (e.g., RealNetworks, Inc.).

Figure 14:
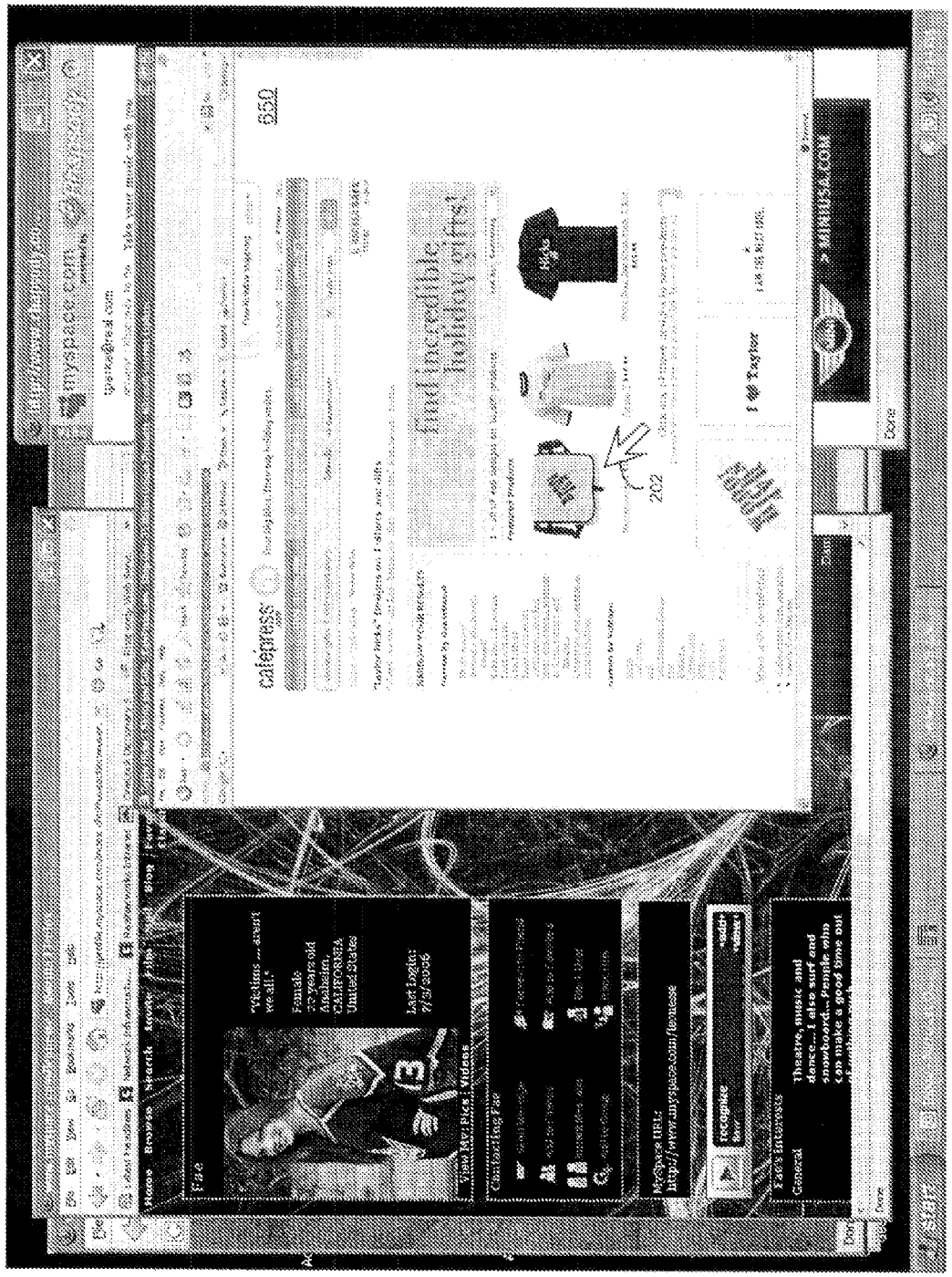
FIG. 14 is a diagrammatic view of a screen rendered by the complementary offer process and/or client application of FIG. 1.

Continuing with the above-stated example, further assume that user 20 wishes to buy some Taylor Hick clothing for Fae to wear to the Taylor Hicks concert. User 20 may select (with screen pointer 202) icon 352, which provides 130 a link to a merchandise ecommerce website (e.g., www.cafepress.com) 650 (FIG. 14), which may be rendered by complementary offer process 10 and may be navigable via screen pointer 202. In this particular example, this link provided 130 is:

http://www.cafepress.com/buy/taylor %20hicks/-/cfpt2_/cfpt_/source_searchBox/copt_

When providing 130 the link to the merchandise ecommerce website, a referring party identifier may be embedded within the link to allow for accurate charging 132 of referral fees. For example, the link provide may be as follows:

http://www.cafepress.com/buy/taylor %20hicks/-/cfpt2_/cfpt_/source_searchBox/copt_&referrer=9160307

In the above-listed link, the referrer=9160307 portion of the link may identify the referring party (e.g., RealNetworks, Inc) and enable payment of the referral fee from the merchant (e.g., Cafepress) to the referring party (e.g., RealNetworks, Inc.).

While complementary offer process 10 is described above as executing a query that includes one or more complementary terms, other configurations are possible and are considered to be within the scope of this disclosure. For example and referring again to FIG. 2, complementary offer process may assign 118 one or more search terms to the item (e.g., "Fae" 300) selected by the user. However, instead of assigning 120 one or more complementary terms, complementary offer process 10 may generate 134 a query string for execution on a third party data store. For example and as discussed above, instead of adding the complementary term "tickets" and searching the internet for Taylor Hicks tickets, complementary offer process 10 may generate 134 a query string (which is based on at least a portion of the search terms) for execution 122 on a specific third-party website. For example, if you want to search for tickets, complementary offer process 10 may generate 134 the query string "Taylor Hicks", which may be provided to www.ticketmaster.com for execution 122 on the www.ticketmaster.com website. This, in turn, may result in the generation 124 of a complementary result set that is presented 126 to user 20 and defines available Taylor Hicks tickets.

Alternatively/additionally, if the user wanted to purchase Taylor Hicks clothing, instead of adding the complementary term "clothing" and searching the internet for Taylor Hicks clothing, complementary offer process 10 may generate 134 the query string "Taylor Hicks", which may be provided to www.cafepress.com for execution 122 on the www.cafepress.com website. This, in turn, may result in the generation 124 of a complementary result set that is presented 126 to user 20 and defines available Taylor Hicks clothing.

Alternatively/additionally, if the user wanted to purchase Taylor Hicks memorabilia, instead of adding the complementary term "memorabilia" and searching the internet for Taylor Hicks memorabilia, complementary offer process 10 may generate 134 the query string "Taylor Hicks", which may be provided to www.ebay.com for execution 122 on the www.ebay.com website. This, in turn, may result in the generation 124 of a complementary result set that is presented 126 to user 20 and defines available Taylor Hicks memorabilia.

Alternatively/additionally, if the user wanted to purchase Taylor Hicks compact discs, instead of adding the complementary terms "compact discs" and searching the internet for Taylor Hicks compact discs, complementary offer process 10 may generate 134 the query string "Taylor Hicks", which may be provided to www.cduniverse.com for execution 122 on the www.cduniverse.com website. This, in turn, may result in the generation 124 of a complementary result set that is presented 126 to user 20 and defines available Taylor Hicks compact discs.

While complementary offer process 10 is described above as executing a query in response the user 20 rendering an audio track (e.g., "Do I Make You Proud" by "Taylor Hicks"), other configurations are possible and are considered to be within the scope of this disclosure. For example, assume that user 20 is logged into a community website that allows people to render video clips. Assuming that user 20 is watching video clips of "I Love Lucy", complementary offer process 10 may automatically generate a query for "I Love Lucy", thus resulting in the generation 105 of a result set that identifies e.g., fans of "I Love Lucy" (as opposed to fans of Taylor Hicks). Upon selecting 116 a specific "I Love Lucy" fan, complementary offer process 10 may automatically generate a query for "I Love Lucy", thus resulting in the generation 124 of a complementary result set that identifies e.g., "I Love Lucy" memorabilia, digital video discs and books. Additionally, if user 20 is reading a webblog that praises a certain politician (e.g., John McCain), complementary offer process 10 may automatically generate a query for that politician (e.g., "John McCain"), thus resulting in the generation 105 of a result set that identifies e.g., fans of "John McCain". Upon selecting 116 a specific "John McCain" fan, complementary offer process 10 may automatically generate a query for that politician (e.g., "John McCain"), thus resulting in the generation 124 of a complementary result set that identifies e.g., "John McCain" memorabilia and books. As another example, if user 20 is looking through online auto classified ads for a 1966 Pontiac GTO, complementary offer process 10 may automatically generate a query for "1966 Pontiac GTO), thus resulting in the generation 105 of a result set that identifies fans of the "1966 Pontiac GTO". Upon selecting a "1966 Pontiac GTO" fan, complementary offer process 10 may automatically generate a query for "1966 Pontiac GTO"), thus resulting in the generation 124 of a complementary result set that identifies "1966 Pontiac GTO" memorabilia, parts, books, and posters, for example.

While complementary offer process 10 is described above as offering e.g., concert tickets, clothing, compact discs, and memorabilia, other configurations are possible and are considered to be within the scope of this disclosure. For example, if Fae lived in Denver, Colo. (instead of Anaheim, Calif.), complementary offer process 10 may have provided 130 links to airline websites to facilitate Fae traveling from Denver, Colo. to Los Angeles, Calif. Additionally, complementary offer process 10 may provided 130 links to hotel websites to facilitate booking lodging for Fae for the night of the concert.

A number of implementations have been described. Nevertheless, it will be understood that various modifications may be made. Accordingly, other implementations are within the scope of the following claims.

What is claimed is:
1. A method of offering complementary products/services comprising:
generating a result set based, at least in part, upon one or more actions taken by a user while browsing a website;
selecting at least one item from the result set; and
generating a complementary result set that defines, at least in part, one or more products/services that complement the at least one item selected from the result set, wherein the generating the complementary result set includes:
assigning one or more complementary terms that define one or more products/services that complement the at least one item selected from the result set;
executing a query on a datastore based on at least a portion of the at least one item selected from the result set and at least a portion of the one or more complementary terms to generate the complementary result set; and
presenting the complementary result set to the user of the website.

2. The method of claim 1 wherein generating a result set includes: monitoring one or more actions taken by the user while browsing the website;
assigning one or more search terms to each of the one or more actions taken by the user, thus defining one or more initial search terms;
executing an initial query on a datastore based on at least a portion of the one or more initial search terms to generate the result set; and
presenting the result set to the user of the website.

3. The method of claim 2 wherein generating a result set further includes:
filtering the result set in accordance with filtering criteria defined by the user.

4. The method of claim 3 wherein filtering the result set includes:
supplementing the one or more initial search terms with one or more user-defined search terms; and
executing a filtering query based on at least a portion of the one or more user-defined search terms.

5. The method of claim 1 wherein generating a complementary result set includes:
generating a query string based, at least in part, upon the one or more actions taken by a user while browsing a website; and
executing a query on a third party datastore based on the query string to generate the complementary result set; and
presenting the complementary result set to the user of the website.

6. The method of claim 1 further comprising:
facilitating the sale of the one or more products/services that complement the at least one item selected from the result set.

7. The method of claim 6 further comprising:
charging a fee for facilitating the sale of the one or more products/services that complement the at least one item selected from the result set.

8. The method of claim 6 wherein facilitating the sale of the one or more products/services that complement the at least one item selected from the result set includes:
providing a link to an ecommerce website that offers for sale the one or more products/services that complement the at least one item selected from the result set.

9. The method of claim 1 wherein the one or more products/services that complement the at least one item selected from the result set is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

10. A computer program product residing on a computer readable medium having a plurality of instructions stored thereon that, when executed by a processor, cause the processor to perform operations comprising:
generating a result set based, at least in part, upon one or more actions taken by a user while browsing a website;
selecting at least one item from the result set; and
generating a complementary result set that defines, at least in part, one or more products I services that complement the at least one item selected from the result set, wherein the instructions for generating a complementary result set include instructions for performing operations comprising:

assigning one or more complementary terms that define one or more products/services that complement the at least one item selected from the result set;

executing a query on a datastore based on at least a portion of the at least one item selected from the result set and at least a portion of the one or more complementary terms to generate the complementary result set; and presenting the complementary result set to the user of the website.

11. The computer program product of claim 10 wherein the instructions for generating a result set include instructions for performing operations comprising:

monitoring one or more actions taken by the user while browsing the website;

assigning one or more search terms to each of the one or more actions taken by the user, thus defining one or more initial search terms;

executing an initial query on a datastore based on at least a portion of the one or more initial search terms to generate the result set; and presenting the result set to the user of the website.

12. The computer program product of claim 10 wherein the instructions for generating a result set further include instructions for performing operations comprising:

filtering the result set in accordance with filtering criteria defined by the user.

13. The computer program product of claim 12 wherein the instructions for filtering the result set include instructions for performing operations comprising:

supplementing the one or more initial search terms with one or more user-defined search terms; and executing a filtering query based on at least a portion of the one or more user-defined search terms.

14. The computer program product of claim 10 wherein the instructions for generating a complementary result set include instructions for performing operations comprising:

generating a query string based, at least in part, upon the one or more actions taken by a user while browsing a website; and executing a query on a third party datastore based on the query string to generate the complementary result set; and presenting the complementary result set to the user of the website.

15. The computer program product of claim 10 further comprising instructions for performing operations comprising:

facilitating the sale of the one or more products/services that complement the at least one item selected from the result set.

16. The computer program product of claim 15 further comprising instructions for performing operations comprising:

charging a fee for facilitating the sale of the one or more products/services that complement the at least one item selected from the result set.

17. The computer program product of claim 15 wherein the instructions for facilitating the sale of the one or more products/services that complement the at least one item selected from the result set include instructions for performing operations comprising:

providing a link to an ecommerce website that offers for sale the one or more products/services that complement the at least one item selected from the result set.

18. The computer program product of claim 10 wherein the one or more products/services that complement the at least one item selected from the result set is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

19. A computing device configured to perform operations comprising:

generating a result set based, at least in part, upon one or more actions taken by a user while browsing a website;

selecting at least one item from the result set; and generating a complementary result set that defines, at least in part, one or more products/services that complement the at least one item selected from the result set, wherein generating a complementary result set includes:

assigning one or more complementary terms that define one or more products/services that complement the at least one item selected from the result set;

executing a query on a datastore based on at least a portion of the at least one item selected from the result set and at least a portion of the one or more complementary terms to generate the complementary result set; and presenting the complementary result set to the user of the website.

20. The computing device of claim 19 wherein generating a result set includes:

monitoring one or more actions taken by the user while browsing the website;

assigning one or more search terms to each of the one or more actions taken by the user, thus defining one or more initial search terms;

executing an initial query on a datastore based on at least a portion of the one or more initial search terms to generate the result set; and presenting the result set to the user of the website.

21. The computing device of claim 20 wherein generating a result set further includes:

filtering the result set in accordance with filtering criteria defined by the user.

22. The computing device of claim 21 wherein filtering the result set includes:

supplementing the one or more initial search terms with one or more user-defined search terms; and executing a filtering query based on at least a portion of the one or more user-defined search terms.

23. The computing device of claim 19 wherein generating a complementary result set includes:

generating a query string based, at least in part, upon the one or more actions taken by a user while browsing a website; and executing a query on a third party datastore based on the query string to generate the complementary result set; and presenting the complementary result set to the user of the website.

24. The computing device of claim 19, wherein the computing device IS further configured to perform operations comprising:

facilitating the sale of the one or more products/services that complement the at least one item selected from the result set.

25. The computing device of claim 24, wherein the computing device IS further configured to perform operations comprising:

charging a fee for facilitating the sale of the one or more products/services that complement the at least one item selected from the result set.

26. The computing device of claim 24 wherein facilitating the sale of the one or more products/services that complement the at least one item selected from the result set includes:
  providing a link to an ecommerce website that offers for sale the one or more products I services that complement the at least one item selected from the result set.

27. The computing device of claim 19 wherein the one or more products I services that complement the at least one item selected from the result set is chosen from the group consisting of: concert tickets; clothing; memorabilia; compact discs; digital video discs; audio tapes; video tapes; books; magazines, photographs; autographs; posters; airline tickets; train tickets; ground transportation; consumer products; consumer services; business products; and business services.

* * * * *